Patented Dec. 17, 1935

2,024,567

UNITED STATES PATENT OFFICE 2,024,567

PREPARATION OF ORGANIC DISULPHIDES

Albert M. Clifford, Stow, Ohio, assignor to Wingfoot Corporation, Wilmington, Del., a corporation of Delaware No Drawing. Application November 23, 1933,
Serial No. 699,403

16 Claims. (Cl. 260—16)

This invention relates to the oxidation of mercaptans, including certain mercaptans substituted in the manner hereinafter described, to form organic disulphides.

In accordance with the teachings of the invention, organic disulphides are prepared by oxidizing mercaptans of the kind described, preferably dissolved or otherwise dispersed in a liquid medium, by means of hydrogen peroxide. Ordinarily, the liquid medium in which the mercaptan to be oxidized is dissolved or otherwise dispersed is water, alcohol or an aqueous solution of alcohol; but any other suitable liquid medium may be employed instead. It is, however, desirable that the liquid medium, if not originally neutral or acid in character, be made such at the time of or shortly after actual oxidation.

In case an alkaline medium is employed, it is usually found best to add an inorganic acid or similar agent in conjunction with the hydrogen peroxide. If the medium is allowed to remain alkaline, precipitation of the organic disulphide is largely, if not entirely, prevented. Preferably, the acidifying agent is added to the alkaline mercaptan solution at the same time as, or shortly after, the hydrogen peroxide is added.

In the practice of the present invention, it is necessary in general only to admix the solution or other liquid vehicle dispersion of the desired mercaptan with hydrogen peroxide. In order to obtain the best yields, it will usually be found desirable to agitate the mass, this being particularly desirable in case a suspension of the mercaptan, rather than a solution, is employed. In some cases, it will be found helpful to permit the mixture to stand at room temperatures for a period of time; in others, to heat the mixture. With neutral and acid liquid vehicle dispersions of mercaptans, it is not strictly necessary to add an inorganic acid or similar agent, but experience has shown that it is generally well to do so.

The mercaptans to which the invention relates are mercaptans in which the -SH group is intact and substituted mercaptans in which the hydrogen atom of the -SH group is replaced by an inorganic radical. In general, any partly or completely alcohol-soluble mercaptan having the formula $(RS)_nM$, wherein R is an organic radical, M is an inorganic radical and $n$ is one or more, may be employed in the practice of the invention. Since the reaction proceeds to best advantage when the mercaptan to be oxidized is dissolved in the particular liquid medium employed, mercaptans soluble in the liquid vehicle are preferred in the practice of the invention, but partly and difficultly soluble mercaptans may be employed with good results in the form of suspensions. Typical of the inorganic radicals represented by M are hydrogen, ammonium, sodium, potassium, lithium, calcium, strontium and barium. The radical R may be any cyclic or acyclic organic radical, aliphatic or aromatic. In general, the mercaptans to which the invention relates are soluble to a greater or less extent in alcohol.

The invention will be illustrated in detail in the following examples.

Example 1

A quantity of 1-mercaptobenzothiazole approximating 25 grams is added to 250 cc. of ethyl alcohol and the resulting suspension heated until a solution forms. Thereupon 9.5 grams of 30% hydrogen peroxide are added with stirring. Oxidation takes place at once, dibenzo thiazyl disulphide being precipitated. After being washed and dried, the crude product, dibenzo thiazyl disulphide, is obtained in a yield of 24.6 grams. The product so obtained melts at 159–162 degrees C.

Example 2

To a suspension of 25 grams of 1-mercaptobenzothiazole in 250 cc. of ethyl alcohol are added a mixture of 9.5 grams of 30% hydrogen peroxide and 5 cc. of a 5% aqueous solution of sulphuric acid. The reaction is agitated at room temperature for a period of approximately ½ hour, a precipitate forming in the meanwhile. After being filtered and dried, the precipitate, dibenzo thiazyl disulphide, is obtained in a yield of 24.5 grams. The product obtained melts at 165–167 degrees C.

Example 3

25 grams of 1-mercaptobenzothiazole are suspended in 250 cc. of water and 9.5 grams of 30% hydrogen peroxide are added thereto. The mixture is agitated at room temperature and 4 cc. of concentrated sulphuric acid are added, the mixture being then boiled for 25 minutes and being meanwhile agitated. The product, after being filtered, washed and dried, is obtained in a yield of approximately 25 grams, approximately 50% of which is dibenzo thiazyl disulphide and approximately 50% of which is 1-mercaptobenzothiazole. The melting point of the mixture is 140–142 degrees C. By carrying out this reaction for a longer period of time, using larger amounts of hydrogen peroxide and sulphuric acid, and effecting a more thorough agitation, a higher yield of dibenzo thiazyl disulphide may be obtained.

Example 4

Dibenzo thiazyl disulphide is prepared by suspending one mol of 1-mercaptobenzothiazole in water, adding thereto sodium hydroxide until the mercaptobenzothiazole goes into solution as the sodium salt. The solution is then heated to approximately 95 degrees C., whereupon an aqueous solution of 30% hydrogen peroxide and sulphuric acid is added, agitation being maintained throughout the operation. Dibenzo thiazyl disulphide precipitates immediately. After filtering, washing several times and drying, the product will be found to be in the form of a white powder melting at approximately 165 degrees C. The equation believed to represent the reaction is as follows:

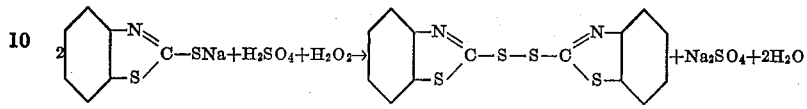

It will be understood that varying amounts of hydrogen peroxide and acid may be employed as desired. In each case the preferred amounts will generally be best determined by experimentation. Usually, however, the desirable proportions will be in the neighborhood of those illustrated herein. It will also be understood that any other agent which will prevent equilibrium in the reaction may be employed instead of sulphuric acid. Examples are hydrochloric acid, nitric acid, formic acid, phosphoric acid, acetic acid, chlor acetic acid, etc. Advantageously the acid is added to the reaction mixture in an amount at least sufficient to neutralize all the alkali formed. Larger amounts may, of course, be employed and in some cases yield better results.

In addition to the mercaptans disclosed, any other mercaptan which will dissolve to a greater or less extent in alcohol may be dispersed in a liquid medium and similarly oxidized to the corresponding disulphide by treating it with hydrogen peroxide and, if desired, with an acid. Among others, any thiazyl sulphide having the grouping

may be employed, examples being 1-mercapto 3-tolyl thiazole, 1-mercapto 4-tolyl thiazole, 1-mercapto 3,5-xylyl thiazole, 1-mercapto 5-methoxy benzothiazole, 1-mercapto 5-ethoxy benzothiazole, 1-mercaptothiazole, 1-mercapto benzimidazole, 1-mercaptobenzoxazole, 1-mercapto 4-chlor benzothiazole, 1-mercapto 5-chlor benzothiazole, 1-mercapto 4-nitro benzothiazole, 1-mercapto 5-nitro benzothiazole, 1-mercapto 5-amino benzothiazole, 1-mercapto naphthothiazole and its various ring substituents, 1-mercapto 3-phenyl thiazole and 1-mercapto 3-phenyl benzothiazole. Still other mercaptans are thio phenol, thio cresol, thio xylol, amino thio phenol, thio napthol, ethyl mercaptan, butyl mercaptan and propyl mercaptan.

While examples of the compounds to be oxidized and of the oxidizing dispersions have been given, it is to be understood that these examples are only illustrative and not limitative of the invention and that the invention is limited only in accordance with the accompanying claims. It is to be understood that by the use of such expression as "dispersing in a liquid medium", it is meant to include both suspensions and true solutions. It is intended that the patent shall cover, by suitable expression in the appended claims, whatever features of patentable novelty reside in the invention.

What I claim is:

1. The process of preparing dithiazyl disulphides which comprises oxidizing a thiazyl mercaptan with hydrogen peroxide in the presence of an inorganic acid.

2. The process which comprises dispersing a thiazyl mercaptan in a liquid medium and oxidizing the mercaptan by treating it with hydrogen peroxide and an inorganic acid.

3. The process which comprises dispersing a thiazyl mercaptan in a liquid medium and oxidizing the mercaptan by treating it with hydrogen peroxide and a material which prevents equilibrium of the reaction.

4. The process of preparing a dithiazyl disulphide having the formula R—S—S—R which comprises treating in a liquid medium with hydrogen peroxide and an inorganic acid an alcohol-soluble mercaptan of the formula $$(R-S)_n-M,$$

wherein R is a thiazyl radical, $n$ is one or more, and M is a radical selected from hydrogen and the metals.

5. The process which comprises simultaneously oxidizing and acidulating a thiazyl mercaptan by treating the same with hydrogen peroxide and sulphuric acid.

6. The process which comprises practically simultaneously oxidizing and acidulating a benzothiazyl mercaptan by treating the same with hydrogen peroxide and sulphuric acid.

7. The process which comprises oxidizing a thiazyl mercaptan by treating it, dispersed in a non-aqueous medium, with hydrogen peroxide.

8. The process which comprises oxidizing a thiazyl mercaptan with hydrogen peroxide.

9. The process which comprises oxidizing 1-mercapto-benzothiazole with hydrogen peroxide.

10. The process which comprises oxidizing with hydrogen peroxide an organic alcohol-soluble mercaptan which has the formula $(R-S)_n-M$ wherein R is a thiazyl radical, $n$ is one or more, and M is an inorganic radical.

11. The process of preparing a dithiazyl disulphide which comprises oxidizing a thiazyl mercaptan in alcohol solution with hydrogen peroxide.

12. The process which comprises heating with hydrogen peroxide in a liquid medium a compound having the formula R—SH, wherein R is a thiazyl radical.

13. The process which comprises heating with hydrogen peroxide in a liquid medium a compound having the formula R—SH wherein R is a benzothiazyl radical.

14. The process which comprises treating a compound having the formula R—SH wherein R is a thiazyl radical with hydrogen peroxide and sulphuric acid.

15. The process of preparing di(benzothiazyl) disulphide which comprises oxidizing a liquid dispersion of a mercapto-benzothiazole with hydrogen peroxide under such conditions that equilibrium of the reaction is prevented.

16. The process of preparing dibenzothiazyl disulphide which comprises oxidizing a solution of 1-mercaptobenzothiazole by treating the same with hydrogen peroxide and sulphuric acid.

ALBERT M. CLIFFORD.